United States Patent [19]
Sawada

[11] Patent Number: 5,806,010
[45] Date of Patent: *Sep. 8, 1998

[54] KINETIC CHARACTERISTIC CONTROL SYSTEM FOR VEHICLE

[75] Inventor: Mamoru Sawada, Yokkaichi, Japan

[73] Assignee: Nippondenso Co., Ltd., Kariya, Japan

[*] Notice: The term of this patent shall not extend beyond the expiration date of Pat. No. 5,584,543.

[21] Appl. No.: 528,147

[22] Filed: Sep. 14, 1995

[30] Foreign Application Priority Data

Sep. 20, 1994 [JP] Japan .................................. 6-225038

[51] Int. Cl.$^6$ .............................. G06G 7/76; G06F 7/70
[52] U.S. Cl. ............................. 701/70; 701/78; 303/10; 303/113.2; 303/166
[58] Field of Search ................. 364/426.05, 426.028, 364/426.025, 426.036, 426.029, 426.023, 426.037, 426.031, 426.032, 431.03, 431.04, 431.051, 431.052, 431.053, 431.07; 303/191, 156, 140, 146, 116.2, 113.2, 141, 150, 174, 61, 116.1, 116.4, 10, 166, 170, 178; 180/197; 477/185, 186, 187, 171, 174; 123/486, 564, 320

[56] References Cited

U.S. PATENT DOCUMENTS

| | | | |
|---|---|---|---|
| 3,859,321 | 1/1975 | Traver | 252/78.3 |
| 4,456,106 | 6/1984 | Schneider | 477/171 |
| 4,838,622 | 6/1989 | Kircher et al. | 303/113.2 |
| 5,141,296 | 8/1992 | Arikawa | 303/113.2 |
| 5,159,990 | 11/1992 | Abe et al. | 180/197 |
| 5,297,662 | 3/1994 | Tsuyama et al. | 477/185 |
| 5,328,006 | 7/1994 | Tsuyama et al. | 477/185 |
| 5,366,039 | 11/1994 | Sawada | 701/20 |
| 5,386,809 | 2/1995 | Reedy et al. | 123/320 |
| 5,449,049 | 9/1995 | Every | 364/426.025 |
| 5,484,194 | 1/1996 | Reinartz et al. | 303/116.2 |
| 5,549,366 | 8/1996 | Toda et al. | 303/113.2 |
| 5,584,541 | 12/1996 | Sone et al. | 303/146 |
| 5,584,543 | 12/1996 | Sawada | 303/191 |
| 5,636,907 | 6/1997 | Okazaki et al. | 303/10 |

FOREIGN PATENT DOCUMENTS

| | | |
|---|---|---|
| 443591 | 8/1991 | European Pat. Off. . |
| 563930 | 10/1993 | European Pat. Off. . |
| 3942343 | 6/1991 | Germany . |
| 9102352 | 8/1992 | Germany . |
| 4107978 | 9/1992 | Germany . |
| 687426 | 3/1994 | Japan . |

OTHER PUBLICATIONS

Patent Abstract of Japan, vol. 18, No. 55 (M–1550) Oct. 1993 re JP–A 5–278500.

*Primary Examiner*—Jacques H. Louis-Jacques
*Attorney, Agent, or Firm*—Cushman Darby & Cushman IP Group of Pillsbury Madison & Sutro LLP

[57] ABSTRACT

A kinetic characteristic control system performs a modifying process for modifying a standby control constant so as to, for example, decrease the standby start opening in correspondence with a calculated braking system control decrease amount x (step 230), a shift pattern characteristic modifying process for modifying a shift position change line so as to make a shift-up thereof easy (step 250), an EFI control amount modifying process for modifying a fuel injection amount, an air-fuel ratio, and an ignition timing (step 270), and a modifying process for a driving system TRC control performance (step 290). These modifying processes are intended for modifying the control constant, control amount, etc. so that the driving torque may decrease to thereby prevent the occurrence of excessive slippage of the drive wheels.

13 Claims, 8 Drawing Sheets

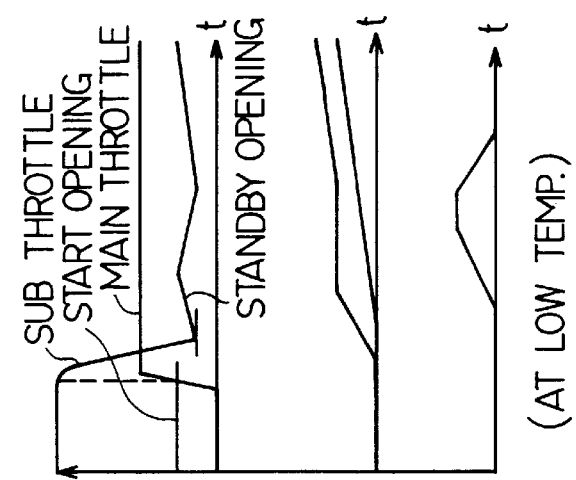
FIG. 9C (AT LOW TEMP.)
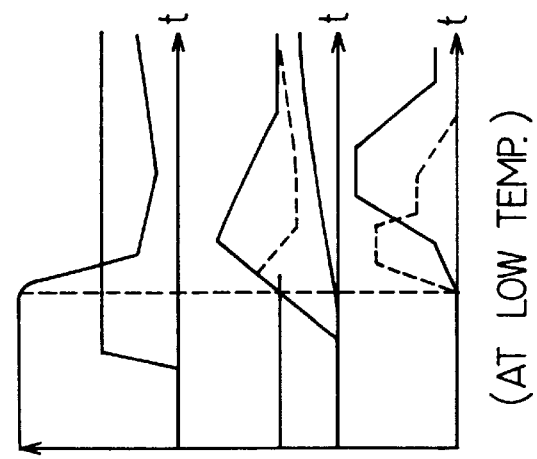
FIG. 9B PRIOR ART (AT LOW TEMP.)
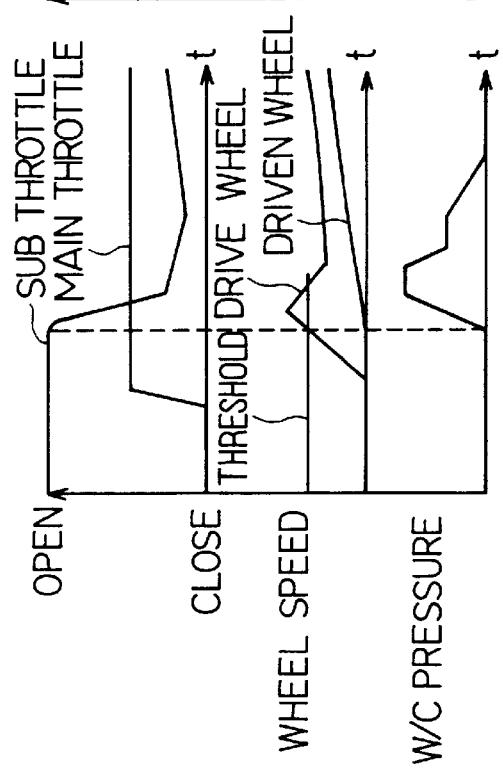
FIG. 9A PRIOR ART (AT NORMAL TEMP.)

KINETIC CHARACTERISTIC CONTROL SYSTEM FOR VEHICLE

CROSS REFERENCE TO RELATED APPLICATION

This application is based upon and claims priority from Japanese Patent Application No. Hei 6-225038 filed Sep. 20, 1994, the contents of which are incorporated herein by reference.

BACKGROUND OF THE INVENTION

1. Field of the Invention

The present invention relates to a kinetic characteristic control system for a vehicle which improves the kinetic characteristics of the vehicle by controlling the braking torque and the driving torque or just the braking torque imparted to the vehicle wheels in for example traction control performed during acceleration slip.

2. Description of the Related Art

Conventionally, a system is known which performs traction control at a time of acceleration slip by controlling a braking torque imparted to vehicle wheels by brake fluid being supplied from a pump discharging brake fluid at a high pressure to wheel cylinders of the vehicle wheels and being discharged from these wheel cylinders, or by controlling a driving torque imparted to a vehicle wheel by, for example, adjustment of the opening of a throttle valve for controlling the amount of air sucked into an internal combustion engine. This traction control will now be explained with reference to FIGS. 9A to 9C. FIG. 9A is a time chart illustrating in a schematic manner variation in throttle opening, vehicle speed, and brake fluid pressure of a wheel cylinder (hereinafter also referred to as "W/C") at a normal-temperature time during which good control is effected.

This example is that of a two-valve system which has a main throttle and a sub-throttle valves. Upon depression of an accelerator, the main throttle which was fully closed is opened with the result that the drive wheel speed increases. When the drive wheel speed exceeds a threshold value for determining an occurrence of a predetermined acceleration slip, the sub-throttle which had been fully open starts to be closed while, on the other hand, the W/C fluid pressure of the drive wheel starts to be increased. By controlling the driving torque and braking torque in this way, the system tries to decrease the acceleration slip.

Regarding this control of the braking torque, particularly in a case where supply of the supply pressure to the W/C is conducted by only the pump driving, the increase gradient of the braking pressure at the slip decrease control time depends solely upon the discharge capacity of the pump. However, sometimes the discharge capacity of the pump deteriorates due to low temperature, which results in that a desired increase gradient of the braking pressure cannot be obtained due to deficiency of the amount of brake fluid discharged and as a consequence an excessive slip at the beginning of the slip control is not suppressed.

As the cause of deterioration in the discharge capacity of the pump at a low-temperature time, there is an increase in the viscous resistance of the brake fluid. That is, even when a brake fluid pressure control valve is changed over to a pressure increasing mode for the same pressure increasing time period as at a normal-temperature time, the actual amount of increase in the brake fluid pressure at a low-temperature time is smaller. FIG. 9B illustrates the manner of control at a low-temperature time and, in FIG. 9B, the illustrated time chart portions of the vehicle speed and W/C fluid pressure include the case of control at a normal-temperature for comparison shown with broken lines. As seen from FIG. 9B, even when the sub-throttle valve is closed as at a normal-temperature time, the increase gradient of the W/C fluid pressure, particularly at a beginning portion thereof becomes small, with the result that the braking performance deteriorates and hence the drive wheel speed increases, which results in deterioration in the convergence of the slip.

As the cause of deterioration in the discharge capacity of the pump, in addition to an increase in the above-mentioned viscous resistance of the brake fluid, in a case where the pump is driven by, for example, a battery, a decrease in the battery voltage due to a low temperature would also deteriorate the discharge capacity of the pump.

As mentioned above, at a time of low temperature, even if the same control of the braking torque as at a normal-temperature time is executed, the acceleration slip of the drive wheels becomes excessive within a time lag after which the W/C fluid pressure actually increases up to a desired high level, so that it is impossible to achieve the object of the acceleration slip control which suppresses the acceleration slip. Particularly, during hill-starting, unless initial acceleration slip is suppressed to a small value, good starting and good acceleration performance can not be obtained and, at the turn acceleration time as well, the stability of the vehicle body is lost.

In view of the above problems, the present invention proposes as a fundamental technical concept an idea of compensating, on the driving torque control side, for a decrease in the braking system control performance attributable to an increase in the viscous resistance of the brake fluid or a decrease in the discharge capacity of the pump and an idea of correcting the contents of control on the braking torque control side.

Meanwhile, regarding the control of the driving torque, Japanese Patent Application Laid-Open No. Hei 3-202647 for example discloses an acceleration slip control system which is adapted to perform a so-called "standby control" in which, with the occurrence of acceleration slip anticipated, the opening of the throttle is set beforehand to an initial opening suitable for suppressing the acceleration slip to thereby realize a good acceleration performance.

The intended purpose of this system is as follows: Even when the operation of causing the opening of the throttle to coincide with a goal value is started from a time of detection of an acceleration slip, the acceleration slip of the drive wheel becomes excessive within a time lag after which the opening of the throttle actually coincides with the goal value. As a consequence, the predetermined aim of conducting the acceleration slip control can not be realized. This system is intended to prevent this. The contents of the control in this system are as follows: When a throttle opening at which an excessive acceleration slip relative to the present road occurs is instructed by the operation of the accelerator, the opening of the throttle is adjusted to an estimated opening of the throttle which was learned at a previous acceleration slip control time and which would enable an optimum acceleration slip ratio to be obtained. That is, in a case where the amount of accelerator operation becomes larger than a reference value at which it is anticipated that acceleration slip occurs, the throttle is immediately controlled to a throttle opening (standby opening) estimated to be optimum which was learned at a previous acceleration slip control time, in advance of the feedback control of the acceleration slip performed after this acceleration slip has actually occurred, to thereby compensate for the time lag required for the driving of the throttle. In addition, since the above reference value is updated according to the condition of acceleration of the vehicle, even when the travel road has changed from a low-$\mu$ road to a high-$\mu$ road, this reference value reflects data of the newest travel road surface of the vehicle.

However, in the above-mentioned standby control, the standby opening that precedes the travel of the vehicle is not determined. That is, immediately after the ignition switch has been turned on, it was impossible to execute the above-mentioned standby control. Further, although it is indeed possible to set, for example, the standby opening with respect to a high-$\mu$ road during a previous travel, as a pre-travel standby opening, since even in this case immediately after the turning-on of the ignition switch the engine and the like are not yet warmed up and the brake fluid is still low in temperature, as mentioned above the discharge capacity of the pump deteriorates due to a low temperature and the amount of fluid discharged becomes deficient. Therefore, it is impossible to perform the acceleration slip control (traction control) appropriately. Additionally, further regarding the above-mentioned standby control, when the throttle is controlled to a throttle opening (standby opening) which was learned at a previous acceleration slip control time and which is estimated to be optimum, the vehicle has traveled for a certain time period. In this condition, the engine and the like are actually warmed up and it is less likely that the brake fluid is still low in temperature. Accordingly, even if outside-vehicle environments such as road surface $\mu$ are identical, at a time of starting to travel, the same traction control as at a normal-temperature time is not realized for the reason that the brake fluid is low in temperature, etc.

SUMMARY OF THE INVENTION

The present invention has been made in order to solve the above-mentioned problems and an object of the present invention is to provide a kinetic characteristic control system for a vehicle adapted to improve the kinetic characteristics of the vehicle by controlling both the braking torque and driving torque, or the braking torque alone, imparted to a vehicle wheel as in the case of, for example, a traction control, in which, even when the braking system control performance is decreased due to an increase in the viscous resistance of a brake fluid by reason of, for example, low temperature, or to a decrease in the discharge capacity of the pump, it is possible to obtain the same control performance as at a normal-temperature time.

To attain the above object, according to the present invention, braking system control means controls the braking torque imparted to the vehicle wheel by performing a change-over control between supply of a brake fluid from a pump discharging brake fluid at a high pressure to a wheel cylinder of the vehicle wheel and discharge of the brake fluid from the wheel cylinder. On the other hand, driving system control means controls the driving torque imparted to the vehicle wheel. Braking system control performance decrease state detecting means detects a state of decrease in the braking system control performance due to an increase in the viscous resistance of the brake fluid or a decrease in the discharge capacity of the pump while, on the other hand, the driving system control correcting means corrects the driving torque control of the driving system control means in correspondence with a state of decrease in the braking system control performance detected by the braking system control performance decrease state detecting means.

There is a case where a decrease in the braking system control performance (i.e. the actual increase gradient of the brake fluid in the W/C becomes small, and so on) occurs due to an increase in the viscous resistance of the brake fluid or a decrease in the discharge capacity of the pump, even when the braking system control is carried out as at a normal-temperature time. In the present invention, since the driving torque control is corrected in correspondence with the state of decrease in it, it is possible to appropriately perform the driving torque control which is the same as in the case where no increase in the viscous resistance of the brake fluid or no decrease in the discharge capacity of the pump occurs. For example, in a case where the increase gradient of the brake fluid becomes small, the decrease in the braking system control performance is compensated for by, for example, decreasing the driving torque imparted to the vehicle wheel, to thereby achieve the same control performance as at a normal time.

As an example of this driving torque control, there is a so-called "traction control system" in which the occurrence of an acceleration slip in the vehicle wheel is detected, the braking torque imparted to the vehicle wheel is controlled by the braking system control means, and the driving torque imparted to the vehicle wheel is controlled by the driving system control means, to thereby suppress a slip during acceleration which occurs in the drive wheel of the vehicle, to a desired range. In the following description, in order to have an easier understanding of the invention, explanation will proceed by taking the traction control as an example.

As mentioned above, for example, at a low-temperature time, the viscous resistance of the brake fluid increases or the battery voltage which is the drive source of the pump motor decreases. Therefore, even when the brake fluid is supplied to the wheel cylinder for the same pressure increasing time period as at a normal-temperature time, the actual amount of increase in the pressure of the brake fluid remains small, so that, in a case where traction control is being performed, convergence of the slip deteriorates. In the present invention, even when such a decrease in the braking torque control performance occurs, the driving torque control is corrected in correspondence with the state of decrease in that performance. Accordingly, the present invention enables the performance of an appropriate driving torque control which is the same as in the case where the discharge capacity of the pump is not decreased. Namely, in the control such as a traction control which is performed for improving the kinetic characteristic of the vehicle, it is possible to obtain, even at a low-temperature time, the same control performance as at a normal-temperature time.

In the above-mentioned braking system control decrease state detecting means, by, for example, actually detecting the amount of discharge of the pump per unit length of time, it is possible to compare this actual amount of discharge with that at a normal-temperature time to thereby detect the state of decrease in the control performance. However, as an alternative method, it is conceivable to provide brake fluid temperature detecting means and estimate the state of decrease in the control performance on the basis of the temperature of the brake fluid detected by the brake fluid temperature detecting means. If, in this case, the relationship between the temperature of the brake fluid and the state of decrease in the control performance is previously stored in the form of, for example, a mapping and the state of decrease is estimated by referring to such a mapping, or the like, this state of decrease will be easily detected.

This brake fluid temperature detecting means may be equipped with engine cooling water temperature detecting means and the brake fluid temperature can be estimated based on the thus-detected temperature of the engine cooling water. Since the temperature of the cooling water is widely utilized for other controls in the vehicle as well, the use thereof is preferable because common use of data can be made.

On the other hand, as the above-mentioned driving system control means, it is conceivable to adjust the opening of the throttle for controlling the amount of air sucked into an internal combustion engine to thereby control the driving torque.

Further, the amount of accelerator operation for instructing the opening of the throttle for controlling the amount of air sucked into an internal combustion engine may be detected by the accelerator operation amount detecting means and, in a case where it is anticipated that an acceleration slip is going to occur on the basis of the amount of accelerator operation, standby control means may control the output of the internal combustion engine so as to suppress it. Further, the driving system control correcting means may correct the amount of accelerator operation for starting the standby control in correspondence with the state of decrease in the braking system control performance.

As the method for suppressing the output of the internal combustion engine, it is conceivable to control the opening of the throttle or perform fuel cut-off. For example, in a case where the braking system control performance decrease state has exceeded a predetermined value, by, for example, forcibly correcting the opening of the throttle to a predetermined opening corresponding to a case of road surface having a value of $\mu$ which is as somewhat small as 0.1 or so, it is possible to obtain the same control performance as at a normal time. Particularly, in a case where the braking system control performance decrease state exceeds the predetermined value, there is a high probability that the temperature of the external air is rather low and a friction state of a road falls down (i.e. a low-$\mu$ road). Therefore, it is effective to forcibly set the opening of the throttle to an opening corresponding to a case of low road-surface $\mu$.

An example of this standby control will now be explained in detail with reference to FIG. 9C. At a low-temperature time, as illustrated in FIG. 9B, even if the throttle is closed as at a normal-temperature time when the drive wheel speed has exceeded a predetermined threshold value, the initial portion in particular of the increase gradient of the W/C fluid pressure becomes small by reason of an increase in the viscous resistance and the like, so that the drive wheel speed rises. As a consequence, convergence of the slip deteriorated.

In contrast, according to the present invention, as illustrated in FIG. 9C, when the opening of the main throttle has reached a predetermined standby start opening, the sub-throttle is driven and set to a throttle opening suiting the suppression of an acceleration slip under a condition wherein the road surface $\mu$ is 0.1. By this setting, it is possible to prevent the occurrence of an excessive acceleration slip.

The standby start opening which is a standard for starting the above standby control is modified in correspondence with the state of decrease in the braking system control performance. By this modification, for example, in a case where the braking system control performance becomes decreased as a result of a lower temperature, the standby start opening is made to be small to thereby start the standby control earlier.

Further, the driving system control correcting means may be equipped with modifying means for modifying at least one of fuel injection amount, air-fuel ratio, and ignition timing of the internal combustion engine, whereby at least one of fuel injection amount, air-fuel ratio, and ignition timing may be modified in correspondence with the state of decrease in the braking system control performance. It is possible to perform fuel cut in the case of modifying the fuel injection amount, to make the mixture lean in the case of modifying the air-fuel ratio, and to control to a retardation side in the case of modifying the ignition timing. Of course, these three factors may be all modified.

Further, in a kinetic characteristic control system for vehicle which is applied to a vehicle equipped with an automatic transmission the shift position of which is automatically changed over based on a preset automatic shift pattern line, the driving system control correcting means is equipped with shift pattern line modifying means for modifying the automatic shift pattern line. By this modifying means, it is conceivable to modify the shift pattern line so as to make the shift-up thereof easy or make the shift-down thereof difficult, in correspondence with the state of decrease in the braking system control performance. As a specific example, it is conceivable to cause the vehicle to start with a second shift position at all times after the braking system control performance decrease state has exceeded the predetermined value.

The techniques which have been described above refer to the case of compensating for the decrease in the braking system control performance on the side of controlling the driving torque. Subsequently, an explanation will be given as to the techniques which refer to the case of coping with the decrease in the braking system control performance by correcting the contents of control on the braking torque control side.

That is, the braking system control means performs a changeover control between supply of a brake fluid from the pump discharging the brake fluid of a high pressure to a wheel cylinder of a vehicle wheel and discharge of it from this wheel cylinder, to thereby control the braking torque imparted to the vehicle wheel. And the braking system control performance decrease detecting means detects the state of decrease in the braking system control performance attributable to an increase in the viscous resistance of the brake fluid or a decrease in the discharge capacity of the pump, and the braking system control correcting means corrects the braking torque control by the braking system control means in correspondence with the state of decrease in the braking system control performance decrease state detected by the braking system control performance decrease state detecting means.

Since there is a case where the braking system control performance decreases as in the above case, for example, a case where, due to an increase in the viscous resistance in the brake fluid, the actual increase gradient of the brake fluid in the W/C becomes small even when the braking system control is performed as at a normal-temperature time, the braking torque itself is corrected this time in correspondence with the state of decrease in the braking system control performance to thereby enable the same control performance as at a normal time to be obtained.

Regarding the correction performed by this braking system control correcting means, it is conceivable to correct the braking torque control by the braking system control means in such a manner as to expedite the starting timing of this braking torque control in correspondence with the state of decrease in the braking system control performance. As the specific contents of such correction, it is conceivable to correct the pump-drive starting timing in such a manner as to expedite it at a time of detecting a state of decrease in the braking system control performance as compared with a time of not detecting it, or to expedite the timing of imparting the brake fluid to the wheel cylinder of the vehicle wheel at a time of said detection as compared with a time of non-detection, to thereby correct the braking torque control starting timing in such a manner as to expedite it.

Particularly, at a low-temperature time, since the discharge capacity of the pump decreases, with the pump alone being driven earlier, actual supply and discharge of the brake fluid to and from the wheel cylinder may be started simultaneously with a time of non-detection of the state of decrease in the braking system control performance. Of course, the two operations may be concurrently used in combined form.

Further, if, at a time when a state of decrease in the braking system control performance has been detected, the pump-drive termination timing is corrected in such a manner as to be delayed as compared with a time of non-detection, it is possible to obtain a smooth rise in the brake fluid pressure gradient at a time of re-occurrence of a slip at the time of termination of the braking system control.

BRIEF DESCRIPTION OF THE DRAWINGS

Other features and advantages of the present invention will be appreciated, as well as methods of operation and the function of the related parts, from a study of the following detailed description, the appended claims, and the drawings, all of which form a part of this application. In the drawings:

FIGS. 9A, 9B and 9C are time charts of conventional technology and of the present invention.

DESCRIPTION OF THE PREFERRED EMBODIMENTS

Preferred embodiment of the present invention will now be described with reference to the drawings.

Figure 1:
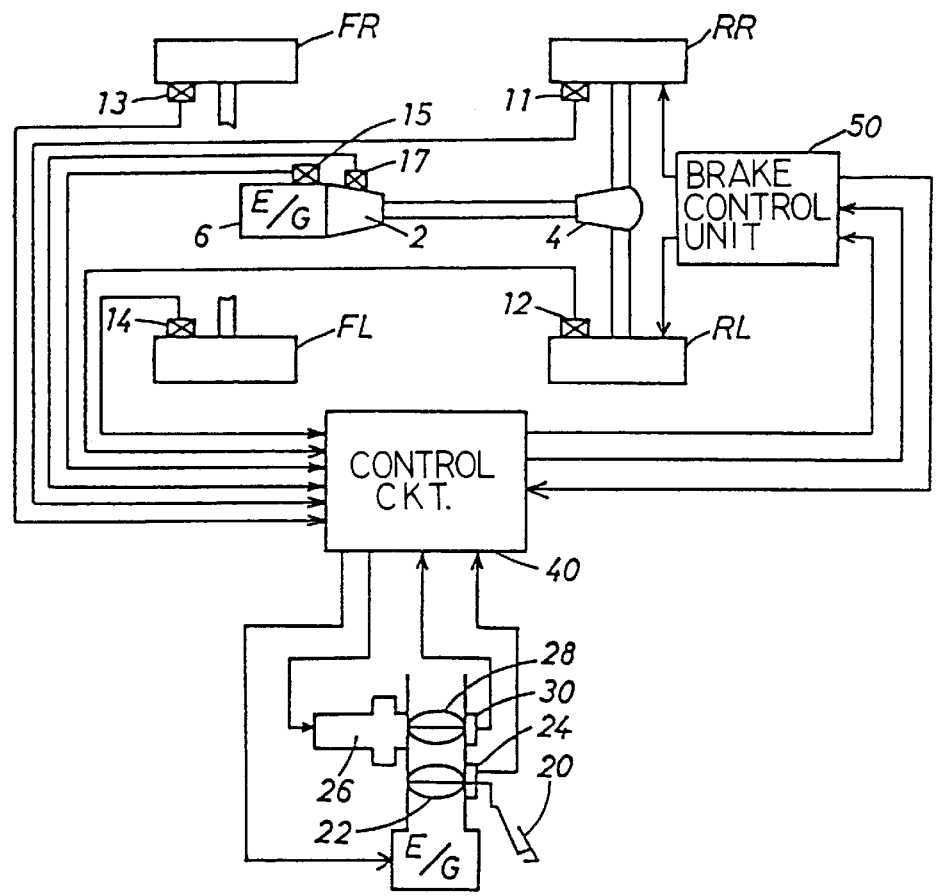
FIG. 1 is a schematic construction diagram illustrating the overall construction of a control system for a vehicle in a case where a kinetic characteristic control system according to the present invention is realized as an acceleration slip control system.

First, FIG. 1 is a schematic construction diagram illustrating the overall constitution of a control system for a vehicle in a case where the kinetic characteristic control system of the present invention is realized as an acceleration slip control system. This preferred embodiment is one in which the invention is applied to a front-engine/rear-drive (FR) type vehicle.

The acceleration slip control system comprises, in a driving force transmission system of the vehicle, electromagnetic pick-up type drive wheel speed sensors 11, 12 for detecting the rotation speeds of rear-right/rear-left drive wheels RR, RL to each of which a driving torque from an internal combustion engine 6 is transmitted via an automatic transmission 2 and a differential gear 4; electromagnetic pick-up type driven wheel speed sensors 13, 14 for detecting the rotation speeds of right and left driven wheels FR, FL at the front of the vehicle; sensors 15 for detecting operating condition parameters of the internal combustion engine 6 such as engine speed, intake air flow rate and cooling water temperature; and a shift position sensor 17 for detecting the shift position of the automatic transmission 2.

Further, the acceleration slip control system comprises, in an intake system for controlling the output torque of the internal combustion engine 6, a main throttle position sensor 24 for detecting the opening of a main throttle 22 interlocked with an accelerator pedal 20 and a sub-throttle position sensor 30 for detecting the opening of a sub-throttle 28 driven by a sub-throttle actuator 26 consisting of a step motor or the like.

Detection signals from the above-mentioned sensors are provided to an electronic control circuit 40 where the magnitudes of the braking and driving torques imparted to the right and left drive wheels RR, RL are determined according to the detection signals from the respective sensors. Control signals prepared according to that determination are provided to a brake control unit 50 and the sub-throttle actuator 26. By opening and closing the sub-throttle 28 using the sub-throttle actuator 26, it is possible to suppress the output torque of the internal combustion engine 6 and thereby control the acceleration slip.

The electronic control circuit 40 transmits a fuel injection instruction to, for example, a fuel injection valve (not shown) to thereby control the amount of fuel injected. It can also control the air-fuel ratio and ignition timing, etc.

Figure 2:
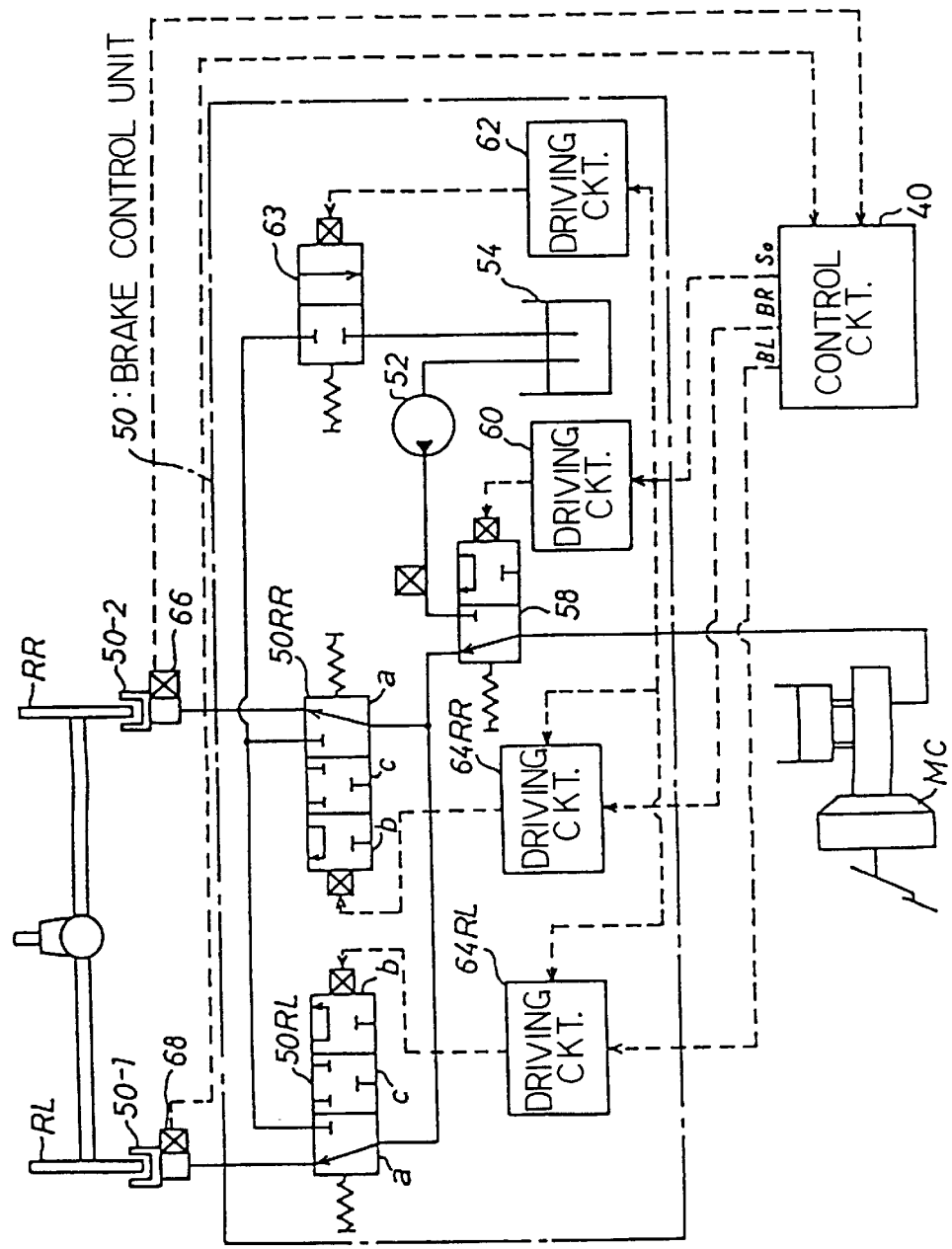
FIG. 2 is an explanatory diagram illustrating the construction of a brake control unit according to a preferred embodiment of the present invention in regard to a hydraulic system in particular.

The brake control system 50 referred to here in this specification is designed to drive and control independently right and left brake devices provided respectively to the drive wheels RR, RL. Next, the detailed construction of this brake control unit 50 will be described with reference to FIG. 2.

The brake control unit 50 receives three kinds of signals, namely a control execution signal S0 output from the electronic control circuit 40 and respective control signals BL, BR for the left and right drive wheels RL, RR output therefrom and, according to these signals, drives brake devices 50-1, 50-2 provided to the left and right drive wheels RL, RR. In a normal condition, the brake devices 50-1, 50-2 are driven by an operating fluid pressure obtained by a driver's brake operation. On the other hand, a pump 52 is used to pump out fluid stored in a reservoir 54 in order to drive the brake devices 50-1, 50-2 according to various control signals from the electronic control circuit 40. Thus, these elements constitute another fluid pressure source. The operating fluid pressure for each brake device 50-1, 50-2 is also produced from this fluid pressure source.

While as mentioned above there exist two fluid pressure sources for driving the brake devices 50-1, 50-2, in a normal condition the fluid pressure source which is obtained from the driver's brake pedal operation is used. That is, brake fluid that has been delivered from a master cylinder MC by the driver's brake pedal operation is supplied to the brake devices 50-1, 50-2 via an fluid passage of an fluid-pressure pipeline changeover valve 58 and a left fluid pressure control valve 50RL and via an fluid passage of the fluid-pressure pipeline changeover valve 58 and a right fluid pressure control valve 50RR, respectively.

The fluid pressure pipeline changeover valve 58 is a two-position valve which changes over the fluid pressure source used for driving the brake devices 50-1, 50-2 to the master cylinder MC or to the pump 52. The fluid pressure pipeline changeover valve 58 normally is kept stable in a position at which the fluid pressure from the master cylinder MC can be supplied to each of the brake devices 50-1, 50-2. Upon input of the control execution signal S0 from the electronic control circuit 40 to a two-position valve driving circuit 60, the position of the fluid pressure pipeline changeover valve 58 is changed over from the above-mentioned stable position during input of the control execution signal S0 and is controlled to a position where the brake devices 50-1, 50-2 can be driven by the fluid pressure from the pump 52.

Further, fluid pressure control valves 50RL, 50RR provided to the left and right wheels are three-position valves which are provided for increasing and decreasing the braking force of the brake devices 50-1, 50-2 using the fluid from the pump 52 that is transmitted via the fluid pressure pipeline changeover valve 58. Each of the fluid pressure control valves 50RL, 50RR has a pressure increasing mode (a), a pressure decreasing mode (b), and a pressure holding mode (c).

The pressure increasing mode (a) is a mode connecting the fluid pressure pipeline changeover valve 58 and the brake devices 50-1, 50-2. This mode is utilized at an ordinary time for generating a braking torque corresponding to an amount of driver's brake operation and at a braking time for increasing the braking torque as a result of slip control.

The pressure decreasing mode (b) is a mode for decreasing the pressure of the brake fluid by connecting a low pressure pipeline and the brake devices 50-1, 50-2. By a two-position valve driving circuit 62 that operates in response to the control execution signal S0 from the electronic control circuit 40, a two-position valve 63 connects the low pressure pipeline and the reservoir 54 that it has theretofore cut off. For this reason, in the pressure decreasing mode (b), the operating fluid of the brake devices 50-1, 50-2 is returned to the reservoir 54 via the low pressure pipeline and then via the two-position valve 63, and thereby the pressure of the brake fluid is decreased.

Further, the pressure holding mode (c) is a mode for holding the pressure of the brake fluid by cutting off the communication between the above-mentioned various fluid passages and the brake devices 50-1, 50-2.

The above-mentioned fluid pressure control valves 50RL, 50RR, each for realizing one of the above-mentioned various modes, are driven and controlled by three-position driving circuits 64RL, 64RR according to the control signals BL, BR from the electronic control circuit 40 during a slip control period in which the fluid pressure pipeline changeover valve 58 is changed over to the pump 52 side.

The three-position driving circuits 64RL, 64RR are set to operable states during a time period in which the control execution signal S0 from the electronic control circuit 40 continues to be output, and drive and control the fluid pressure control valves 50RL, 50RR according to the control signals BL, BR similarly output from the electronic control circuit 40. In this preferred embodiment, the pressure of the brake fluid of the brake devices 50-1, 50-2 is subjected to increase or decrease control according to pressure increasing or decreasing duty factors D set based on the control signals BL, BR. That is, a time period t ($t = D \cdot T$) in which the pressure of the brake fluid is increased or decreased per predetermined unit of time T is determined according to the control signals BL, BR from the electronic control circuit 40. According to the thus-determined time period value, at the brake fluid pressure increase time, the fluid pressure control valves 50RL, 50RR are subjected to duty control between the modes (a) and (c) and, at the brake fluid pressure decrease time, the fluid pressure control valves 50RL, 50RR are subjected to duty control between the modes (b) and (c), thereby controlling the pressures of the brake fluid of the brake devices 50-1, 50-2.

While as mentioned above the pressures of the brake fluid of the brake devices 50-1, 50-2 are increase or decrease controlled using the various control signals from the electronic control circuit 40, the pressures of the brake fluid of the respective brake devices 50-1, 50-2 are detected by drive wheel brake fluid pressure sensors 66, 68 in order to increase the control precision of this brake fluid pressure control and the detected results are fed back to the electronic control circuit 40.

Figure 3:
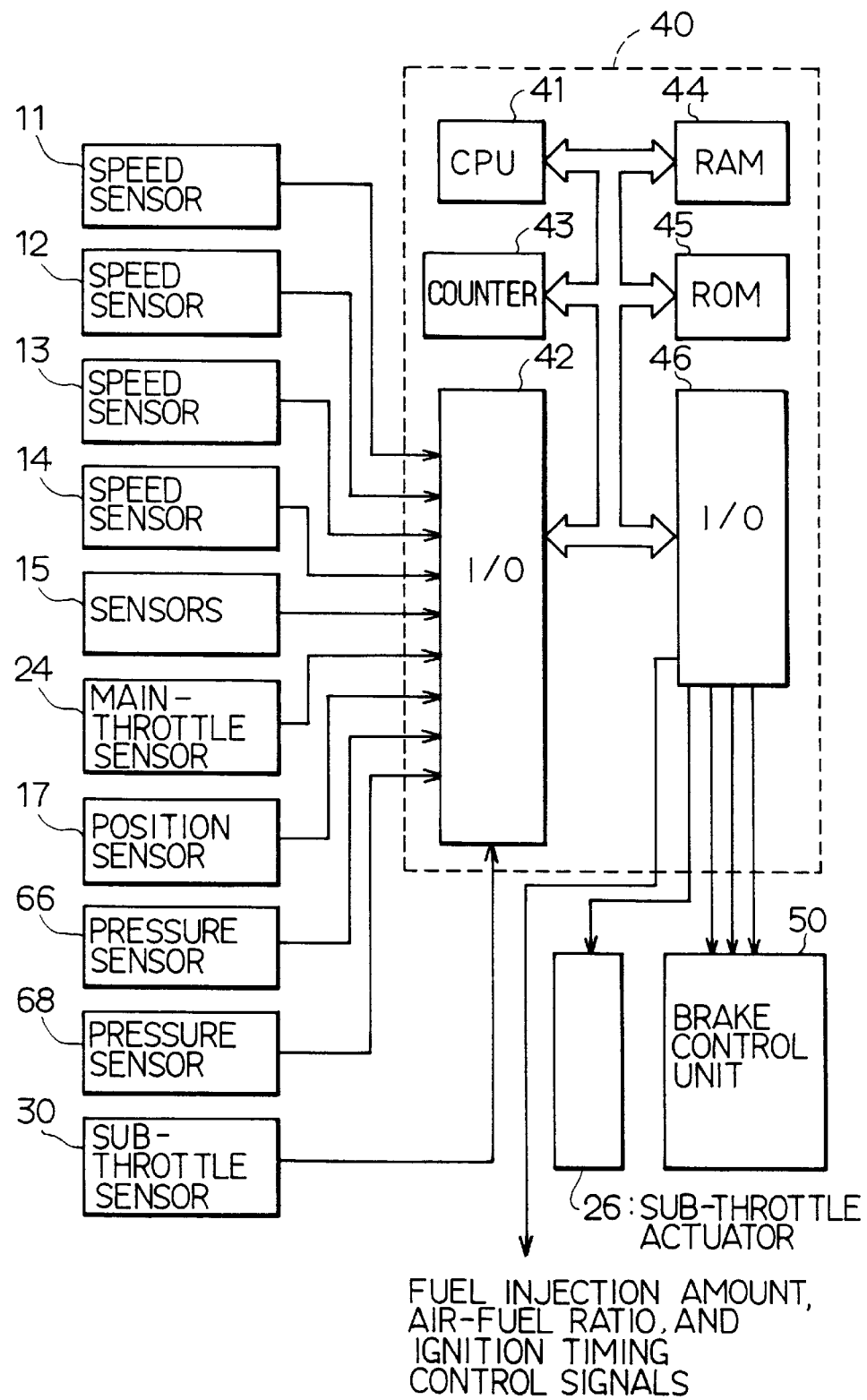
FIG. 3 is an explanatory diagram illustrating the construction of an electric system according to the preferred embodiment of the present invention.

Next, an electric system such as the electronic control circuit 40 and the like according to this preferred embodiment will be explained with reference to FIG. 3.

Various detection signals from the above-mentioned various sensors including the drive wheel speed sensors 11, 12, sensors 15 for detecting the operating condition of the internal combustion engine 6, drive wheel brake fluid pressure sensors 66, 68, etc. are provided to the electronic control circuit 40. Various control signals provided to the sub-throttle actuator 26 and brake control unit 50, or control signals for fuel injection amount, air-fuel ratio, and ignition timing are determined according to those detection signals. The electronic control circuit 40 comprises a logical operation circuit in order to execute complex processing of those detection signals or data. It includes a CPU 41 for performing logical operations, an I/O port 42 constituting an input interface for the various sensors, a counter 43 for counting a number of pulses corresponding to the engine speed provided from the sensors 15, a RAM 44 for temporarily storing logical operation results, etc., a ROM 45 for pre-storing an operation program as will be described later, control data, etc., and an I/O port 46 for outputting control signals to the sub-throttle actuator 26 and to the brake control unit 50.

Next, the operation of the acceleration slip control system thus constructed according to the preferred embodiment will be explained. Firstly, an outline of the acceleration slip control operation will be explained.

When an acceleration slip occurs in the drive wheels RR, RL due to, for example, a sudden accelerator operation by a driver on a low-$\mu$ road, both the control of the driving system and that of the braking system are performed by instruction signals from the electronic control circuit 40. The control of the driving system is for suppressing the output torque of the internal combustion engine 6, such as by closing the sub-throttle 28, or for outputting an instruction to decrease the fuel injection amount or to cause a retardation in the ignition timing.

On the other hand, the control of the braking system is for operating the pump 52 and transmitting the control signals BL, BR to the fluid pressure control valves 50RL, 50RR provided to the left and right drive wheels to thereby adjust (increase or decrease) the braking force of the brake devices 50-1, 50-2. Specifically, each of the fluid pressure control valves 50RL, 50RR is changed over to a suitable one of the three modes, i.e. the pressure increasing mode (a), the pressure decreasing mode (b), and the pressure holding mode (c) to thereby suppress the acceleration slip.

As mentioned above, at a low-temperature time, the viscous resistance of the brake fluid increases, the battery voltage that is a drive source for the motor driving the pump 52 decreases, etc. As a result, even when each of the fluid pressure control valves is kept in the pressure increasing mode (a) for the same period as at a normal-temperature time, the actual amount of increase in the pressure of the brake fluid is smaller. Therefore, a desired braking torque is not imparted to the drive wheels, and the suppression performance of the acceleration slip is impaired.

In view of this, the first preferred embodiment is directed, in a case where the braking torque control performance is deteriorated in such way, to compensating for this by correcting the driving torque control side in correspondence with the conditions by which that performance is being deteriorated.

Figure 4:
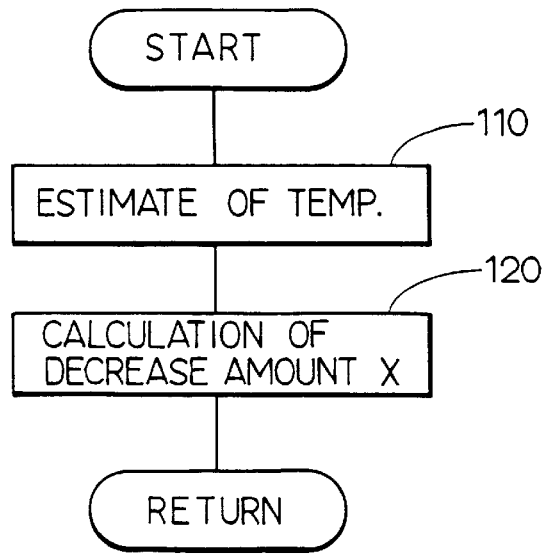
FIG. 4 is a flow chart illustrating a braking system control decrease amount detection process according to the preferred embodiment of the present invention.

The operation of correcting the driving torque control side will now be explained with reference to FIGS. 4 through 8. FIG. 4 illustrates a braking system control decrease amount detecting process which is performed in accordance with a control program stored in the ROM 45 of the electronic control circuit 40, and which is executed, for example, in 5 ms units.

As illustrated in FIG. 4, firstly, in step 110, the temperature of the brake fluid is estimated. In this preferred embodiment, this estimation is made not by directly measuring the temperature of the brake fluid but is made based on the temperature of the cooling water of the internal combustion engine 6 obtained from the sensors 15. Since the temperature of the cooling water thereof is also widely used for other controls in the vehicle, the use of this temperature is preferable in terms of common use of data.

In step 120, the braking system control decrease amount x is calculated based on the thus-estimated temperature of the brake fluid, whereupon this detecting process is once terminated. As regards the calculation of the braking system control decrease amount x, since relevant characteristics differ from one vehicle to another according to, for example, differences in the braking system fluid pressure piping length, the characteristic mapping for example, corresponding to each vehicle, which shows the temperature of the brake fluid and its corresponding braking system control decrease amount may be stored beforehand. And the amount x may be calculated by referring to the characteristic mapping. This characteristic mapping is set so that the lower the temperature of the brake fluid is, the larger the braking system control decrease amount x may be.

The driving system control compensating process (FIG. 5) shown below is executed based on the thus-calculated braking system control decrease amount x.

Figure 5:
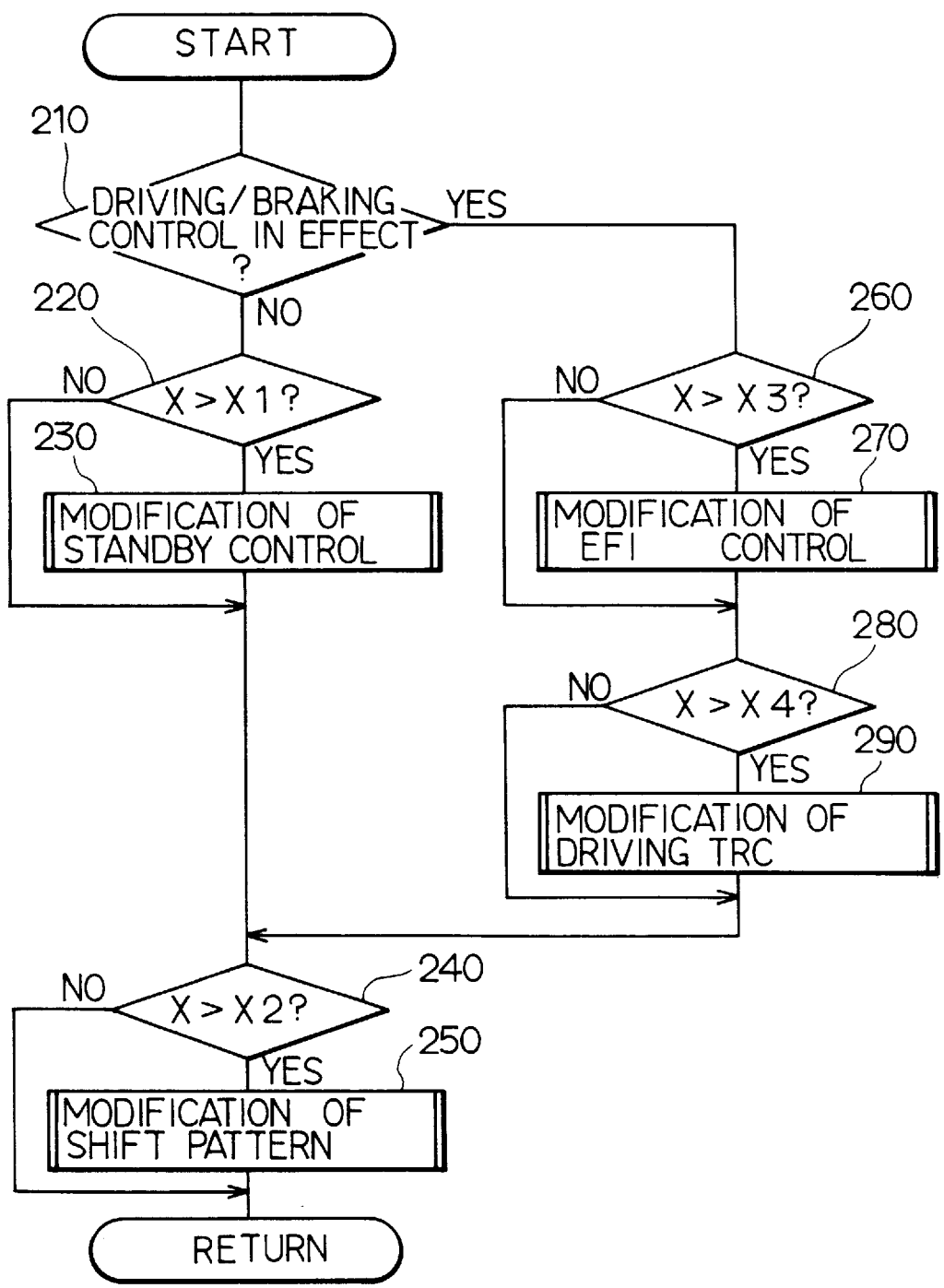
FIG. 5 is a flow chart illustrating a driving system control correction process according to the preferred embodiment of the present invention.

This process is executed, for example, in 5 ms units. In this process, as illustrated in FIG. 5, firstly, in step 210, it is determined whether or not the driving system or the braking system control is presently in effect. If that control is not in effect (step 210: NO), it is determined in step 220 whether or not the braking system control decrease amount x as calculated in the process of FIG. 4 is larger than a first decision value x1. If x>x1, the processing operation proceeds to step 230 in which a standby control constant is modified. This modifying process for the standby control constant will be explained later in detail. Now putting it aside, the explanation will go ahead.

If the result of the determination in step 220 is "NO", namely if x≦x1, the operation in step 230 is not executed and the operation proceeds to step 240 in which it is determined whether or not the braking system control decrease amount x is larger than a second decision value x2. If x>x2, the operation proceeds to step 250 in which a shift pattern characteristic is modified. The modifying process for this shift pattern characteristic is a process for modifying the shift pattern in the automatic transmission.

A specific example of the modification of this shift pattern characteristic is as follows. Assume that an automatic transmission wherein the shift position is automatically changed over according to a preset automatic shift position change line is designed so that this automatic shift position change line can be modified. If this line is an up-shifting shift position change line, this line is modified according to the braking system control performance decrease amount x so that the shift position change line may be easily shifted up. Or if said line is a down-shifting shift position change line, this line is similarly modified so that the shift position change line may be difficultly shifted down. By modifying the shift pattern characteristic, it is also possible to realize, for example, a two-speed start. At the low-temperature time, by making the up-shifting operation easy as mentioned above, the shift position is automatically shifted to a stage which is, for example, one step up with even the same accelerator operation amount. As a result, the driving torque which is applied to the vehicle wheels is suppressed. Thus, it is possible to compensate for a decrease in the control of the braking torque.

If the result of the determination in step 240 is "NO", namely if x≦x2, the processing operation in step 250 is not executed and this driving system control compensating process is once terminated.

On the other hand, if the result of the determination in step 210 is "YES", namely if the driving system or the braking system control is presently in effect, the operation proceeds to step 260 where it is determined whether or not the braking system control decrease amount x is larger than a third decision value x3. If x>x3, the operation proceeds to step 270 where modification of the EFI control amount is performed. On the other hand, if the result of the determination in step 260 is "NO", namely if x≦x3, the processing operation in step 270 is not executed and the operation proceeds to step 280 where it is determined whether or not the braking system control decrease amount x is larger than a fourth decision value x4. If x>x4, the operation proceeds to step 290 where a modifying process for driving system TRC control amount is executed. If the result of the determination in step 280 is "NO", namely if x≦x4, the processing in step 290 is not executed and the operation proceeds to step 240.

As mentioned above, the modifying process for standby control constant in step 230 is executed only when the driving system or the braking system control is not in effect while, on the other hand, the modifying process for EFI control amount in step 270 and the modifying process for driving system TRC control amount in step 290 are executed only when the driving system or the braking system control is in effect. Further, the modifying process for shift pattern characteristic in step 250 is executed at all times (regardless of whether or not the driving system or the braking system control is in effect).

The modifying process for EFI control amount in step 270 will now be explained. The EFI control is directed to modifying at least one of the fuel injection amount, air-fuel ratio, and ignition timing applied to the internal combustion engine. Since EFI control is intended to be performed to compensate for a decrease in brake performance by the driving system as mentioned above, a conceivable method for realizing such compensation is, for example, to cut the amount of fuel in the case of modifying fuel injection amount, to perform control so as to be a lean side in the case of modifying air-fuel ratio, or to perform control so as to be a retardation side in the case of modifying ignition timing. Of course, two or three of these driving system factors may be modified at the same time.

The modifying process for driving system TRC control amount in step 290, along with the modifying process for standby control constant, explanation of which is deferred, will be given below with reference to FIGS. 6A, 6B and 7.

Figure 6A:
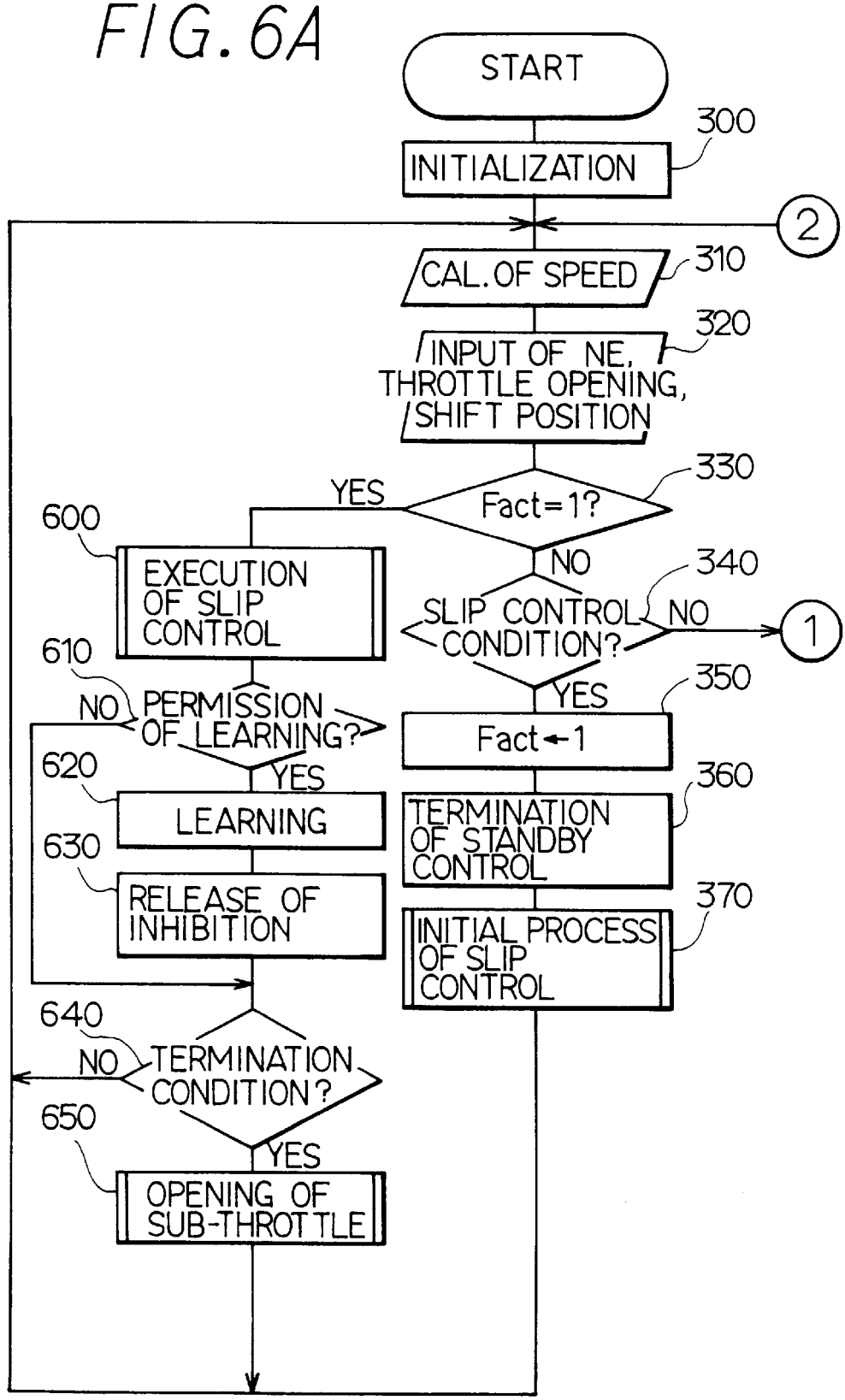
FIG. 6A is a flow chart illustrating an acceleration slip control process according to the preferred embodiment of the present invention.
Figure 6B:
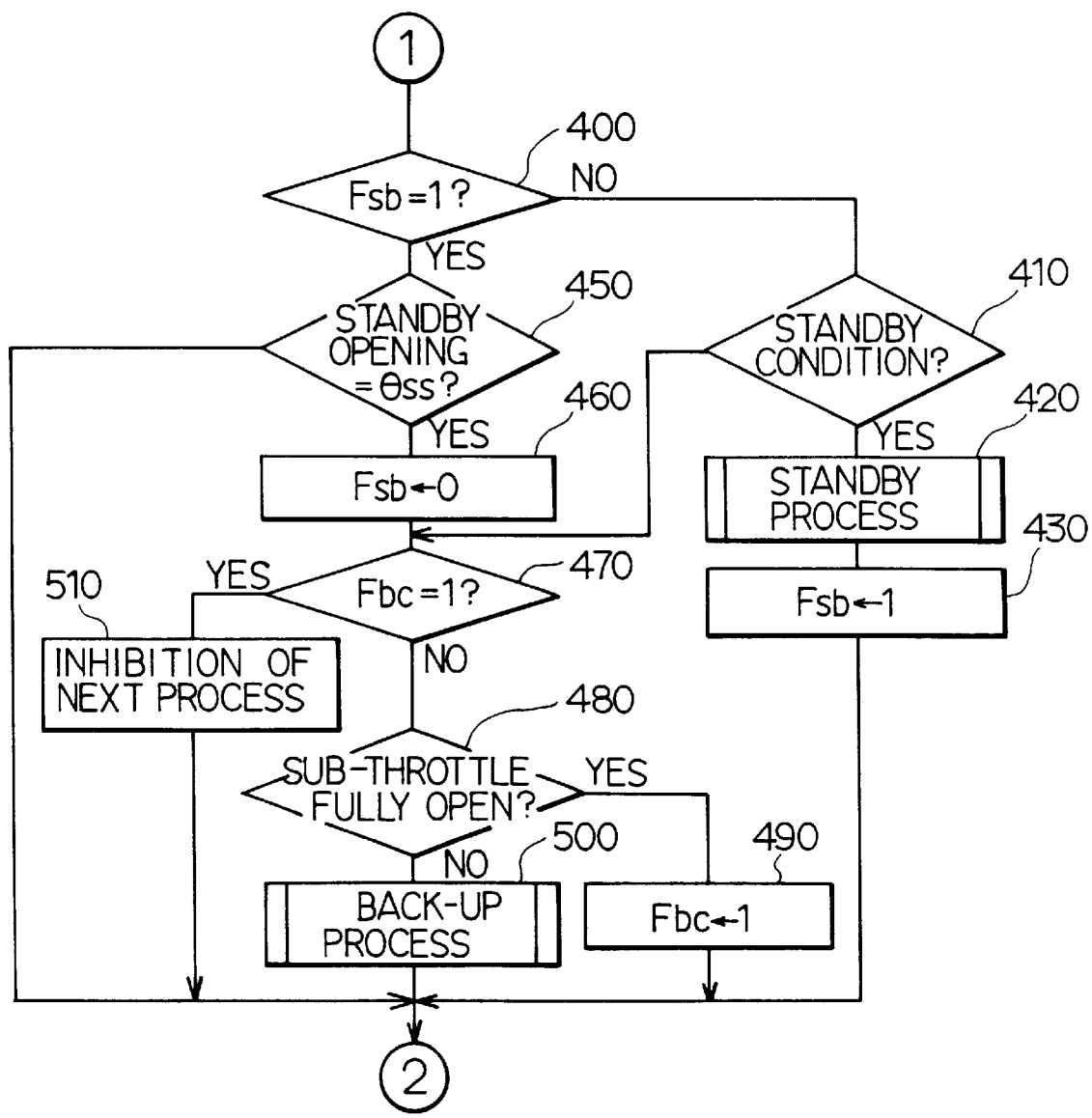
FIG. 6B is a flow chart illustrating the acceleration slip control process according to the preferred embodiment of the present invention.

FIGS. 6A and 6B are flow charts illustrating an acceleration slip control process which is executed, for example, in 5 ms units. Upon start of the execution of the relevant processing, initialization such as initial settings of various flags is executed (step 300). Then, after inputting and processing the detection signals from the driven wheel speed sensors 13, 14 and those from the drive wheel speed sensors 11, 12, The electronic control circuit 40 calculates vehicle speed Vcr, drive wheel speed Vmw, vehicle acceleration αcr, control start speed Vst with respect to the vehicle speed Vcr, etc. which become necessary when processing described hereafter is performed (step 310). Further, in order to know the present operating conditions of the vehicle, the electronic control circuit 40 inputs the detection signals from the sensors 15, respective throttle position sensors 24, 30, and shift position sensors 17 (step 320).

Next, whether or not the acceleration slip control based on the feedback control of the opening of the sub-throttle 28 is being executed in order to suppress acceleration slip is determined by confirming whether or not a flag Fact which is set at "1" during execution of the acceleration slip control described later is set at "1" (step 330). If acceleration slip control has not yet been executed, it is determined whether or not the conditions for starting the acceleration slip control have already been established, for example whether or not the present drive wheel speed Vmw is over the control start speed Vst (step 340). If such conditions have been newly established, the flag Fact is set at "1" (step 350). Then the operation terminates or stops the performance of standby control which is another mode of acceleration slip control described later (step 360), and executes initial operation of the acceleration slip control (step 370). The operation then returns to step 310.

The wording 'initial operation of acceleration slip control' referred to above means an initial processing which is executed early in the feedback control of the sub-throttle 28; specifically, setting of an initial opening θst and driving of the sub-throttle 28 to this initial opening θst. This initial opening θst is determined based on the shift position and the revolution speed of the internal combustion engine 6 and according to the equitorque curve thereof.

In this preferred embodiment, in a case where the acceleration slip control was previously performed, an equitorque curve is selected based on the driving torque of the internal combustion engine 6 at which the acceleration slip was controlled at that time to a proper value, the equitorque curve corresponding to that driving torque. According to this selected equitorque curve the initial opening θst is set based on the shift position and the revolution speed of the internal combustion engine 6. On the other hand, in a case where the acceleration slip control is performed for the first time, a predetermined value is set as the initial opening θst.

This initial opening θst is one of the items subjected to the driving system TRC control amount modifying process in step 290 of FIG. 5. Accordingly, where the braking system control decrease amount x is larger than the third decision value x3, the initial opening θst is corrected in correspondence with the braking system control decrease amount x. Specifically, the initial opening θst is corrected so that it may further approach a totally closed position.

Further, in this initial processing, a drive-wheel goal speed Vsp is also set. This drive-wheel goal speed Vsp, as is well known, is calculated by adding a predetermined slip value to the vehicle speed Vcr calculated from the average value of the detected values obtained from the driven wheel speed sensors 13,14.

Figure 7:
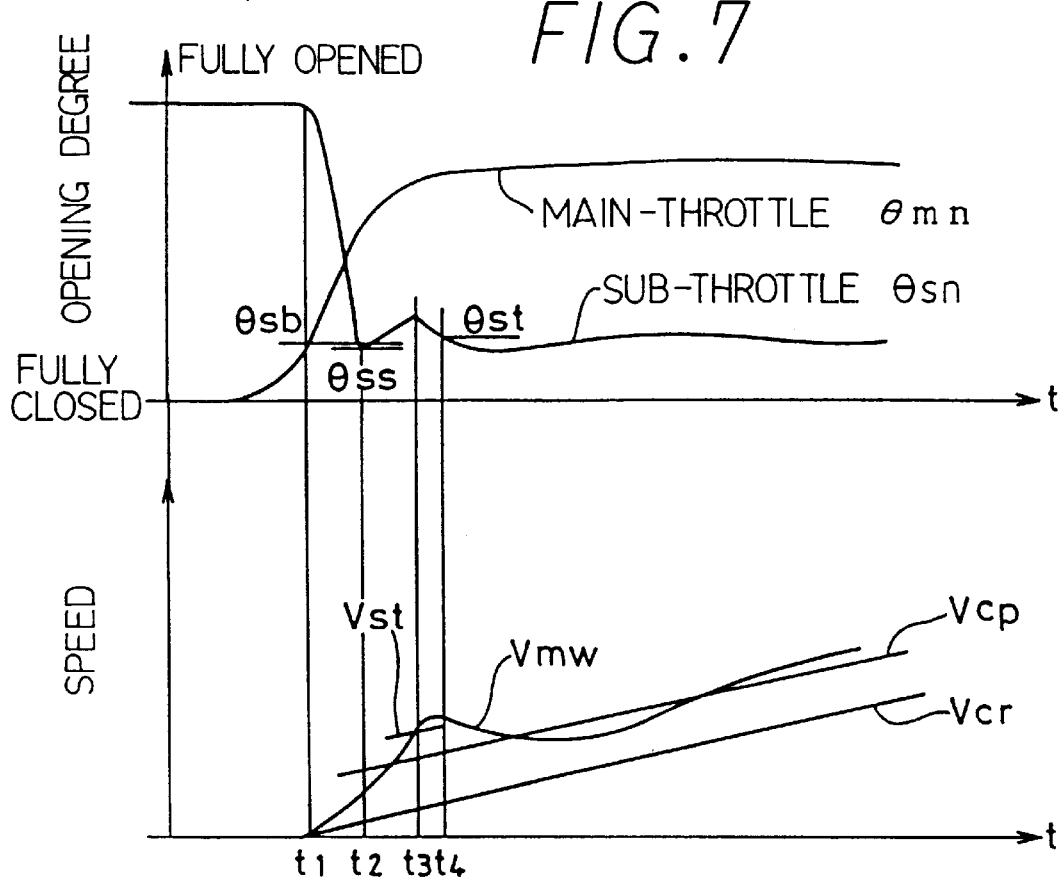
FIG. 7 is a time chart illustrating an acceleration slip control including a standby control according to the preferred embodiment of the present invention.

A time period (t3–t4) in FIG. 7 indicates the result of the initial processing of the acceleration slip control. When it is assumed that, at a time t3 shown in FIG. 7, the drive wheel speed Vmw exceeds the control start speed Vst, whereupon the conditions for starting acceleration slip control have been established, the opening of the sub-throttle 28 is sharply decreased down to the initial opening θst simultaneously with the establishment of such conditions. As a result, the output torque of the internal combustion engine 6 decreases, whereupon the drive wheel speed Vmw starts to decrease toward the goal value Vsp. Note that in the case of decreasing the opening of the sub-throttle 28 down to the initial opening θst, it is also conceivable as an alternative method to correct the opening of the sub-throttle 28 in correspondence with the above-mentioned braking system control decrease amount x. Specifically, it is conceivable, for example, to first sharply reduce it down to the totally closed side and then gently increase it up to the initial opening θst.

As is apparent from FIG. 7, according to the acceleration slip control of this preferred embodiment, the opening of the sub-throttle 28 is reduced down to around the initial opening θst before ordinary acceleration slip control based on the performance of the feedback control is executed. Namely, the opening of the sub-throttle 28 can be instantaneously decreased down to the initial opening θ.

Next, the process for previously decreasing the opening of the sub-throttle 28 as mentioned above (hereinafter referred to as "the standby process" and "the back-up process") will be explained.

When the flag Fact is reset to "0" and the acceleration slip control conditions have not yet been established, the determination in step 340 is "NO" and the processing operation proceeds to step 400.

In step 400, it is determined, according to the state of a flag Fsb, whether or not the standby process as later described is already being executed. When it has been determined that the flag Fsb is in a reset state, it is determined whether or not the conditions for executing the standby process have been established (step 410). If such conditions have not yet been established, the operation proceeds to step 470.

In step 410, when the opening θmn of the main throttle 22 which indicates the amount of operation of the accelerator pedal 20 has exceeded a standby start opening θsb, it is determined that the conditions for executing the standby process have been established. This standby start opening θsb is a value at which there is a high possibility that excessive acceleration slip may occur thereafter due to the operation of the main throttle 22. Namely, this standby start opening θsb is set to determine the possibility that acceleration slip may occur before the actual occurrence of such an acceleration slip.

As in the case of the above-mentioned initial opening θst, in a case where acceleration slip control has previously been executed, this standby start opening θsb is also updated according to the driving torque of the internal combustion engine 6 at which the previous acceleration slip was controlled to a proper value. On the other hand, in the case of an acceleration slip control has not been performed yet, a predetermined value is set as the standby start opening θsb.

The standby start opening θsb is one of the items subjected to the standby control constant modification process in step 230 of FIG. 5 and, if the braking system control decrease amount x is larger than the first decision value x1, is corrected in correspondence with the braking system control decrease amount x. Specifically, the standby start opening θsb is corrected so that it may further approach a totally closed state. That is, if x>x1, the braking system control performance is decreased by reason of a low temperature, etc. as compared with that at a normal-temperature time. Therefore, the sub-throttle 28 is made to start to be driven further earlier toward the totally closed side to thereby prevent the occurrence of excessive slip.

Turning back to FIG. 6B, when it has been determined in step 410 that the conditions for the standby process have been established according to the present opening of the main throttle 22, the standby process is immediately executed (step 420). A flag Fsb used for storing a transition to the standby process mode is set to "1" (step 430), the operation returning to step 310. Note that the "standby process" means a control operation of decreasing the opening of the sub-throttle kept in a totally opened state down to a standby opening θss at the highest possible speed.

This standby opening θss, in a case where an acceleration slip control has been previously executed, is learned similarly to when the opening θsb for the main throttle which composes the above-mentioned standby process starting conditions is learned. On the other hand, in the case of an acceleration slip control has not been performed yet, a predetermined value is similarly set as the standby opening θss. Namely, this standby opening θss is the opening of the sub-throttle 28 which becomes necessary for suppressing the output of the internal combustion engine 6 so as to prevent the occurrence of excessive acceleration slip.

This standby opening θss is also one of the items subjected to the standby control constant modification process in step 230 of FIG. 5 and, if the braking system control decrease amount x is larger than the first decision value x1, is corrected in correspondence with the braking system control decrease amount x. Namely, if x>x1, the braking system control performance is decreased by reason of a low temperature, etc. as compared with that at a normal-temperature time. Therefore, the sub-throttle 28 is made to start being driven further toward the totally closed side to thereby prevent the occurrence of excessive slip.

The manner of variation in each throttle which occurs from the start of this standby process is indicated in a time period (t1–t2) in FIG. 7. Namely, immediately after the opening of the main throttle 22 has exceeded the standby start opening θsb (time t1), the sub-throttle 28 rotates down to the standby opening θss (time t2). By correcting the standby start opening θsb and the standby opening θss in correspondence with the braking system control decrease amount x, it is possible to suppress the output torque of the internal combustion engine and thus, in the case where braking performance deteriorates due to low temperature, etc., compensate for this deterioration of the braking performance by the driving system.

When, upon the standby process being executed with the result that the flag Fsb is set to "1", the acceleration slip control conditions have not yet been established (time period <t2–t3> in FIG. 7), the operation proceeds from step 400 to step 450 and subsequent steps where the back-up process is executed. Note that the "back-up process" is a process for gradually opening the sub-throttle 28 which has been restricted down to the standby opening θss by the standby process and thereby avoiding the feeling that the vehicle is stalling.

In the back-up process, firstly, in step 450, it is determined whether or not the opening of the sub-throttle 28 is equal to the standby opening θss, namely whether or not the standby process is completed. If the standby process is not completed, the operation returns to step 310.

On the other hand, if the standby process is completed, the flag Fsb is reset (step 460) in order to store this completion. Then, as described later, it is determined from the state of a flag Fbc set when the back-up process is completed whether or not the back-up process has been completed (step 470). If the back-up process has not yet been completed, it is determined whether or not the sub-throttle 28, which is gradually opened by the back-up process, has already been totally opened (step 480). If the sub-throttle 28 is in a totally opened state, it is determined that the back-up process has been completed, whereupon the flag Fbc is set to "1" (step 490) and the operation returns to step 310. If the sub-throttle 28 is not yet in a totally opened state, the back-up process for driving the sub-throttle 28 so that the opening thereof may be equal to the goal opening θsp calculated so as to gradually increase or so that, when that goal opening θsp is not smaller than the opening θmn of the main throttle 22, the opening of the sub-throttle 28 may become totally opened at the highest possible speed is executed (step 500) and the operation returns to said step 310.

The state of operation in this back-up process (step 500) is exemplified in a time period (t2–t3) of FIG. 7. In FIG. 7, as mentioned above, since the acceleration slip control conditions are established at a time t3, the opening of the sub-throttle 28 does not totally open as a result of this back-up process (step 500). Namely, in this case, the processing operation in step 490 is not executed, the flag Fbc remaining reset.

Next, a case where, unlike the state illustrated in FIG. 7, the opening of the sub-throttle 28 has become totally opened as a result of the back-up process (step 500) will be explained. In this case, the determining process in step 480 results in a determination of "YES", the step 490 is selectively executed, and the flag Fbc is set at "1". Accordingly, the next-time determining process in step 470 results in a determination of "YES" and the operation proceeds to step 510. In this step 510, an inhibiting process for inhibiting the next execution of the standby process and back-up process (steps 410 through step 500) is executed. Namely, in this case, it is intended that the closing control of the sub-throttle 28 by the standby and back-up processes is excessively executed relative to the actual conditions of the road surface and vehicle traveling, and therefore there is a possibility of impairing the acceleration characteristic of the vehicle. For this reason, the execution of the standby and back-up processes is inhibited until the standby start opening θsb, standby opening θss, etc. which match the current conditions of the road surface and vehicle traveling are newly learned. This inhibiting process is achieved, for example, by setting the flag Fsb to "1" and thereby setting the standby process in a "dummy" execution.

As mentioned above, the standby process and the back-up process are executed based on the standby start opening θsb, standby opening θss, etc. learned as occasion demands prior to the performance of the acceleration slip control based on the feedback control. Further, when the thus-learned values excessively decrease the output of the internal combustion engine, the standby and back-up processes are inhibited until the learned values are updated.

Next, a learning process for various learned values will be explained.

The above-mentioned respective learned values are learned and updated during the execution of the acceleration slip control based on the feedback control. Namely, after the conditions for starting the acceleration slip control have been established with the result that the flag Fact has been set to be "1" (step 350), the processing operation proceeds to step 600 where an ordinary acceleration slip control for feedback controlling the opening of the sub-throttle 28 is executed. The opening control of the sub-throttle 28 resulting from this acceleration slip control, as well known, reflects the present condition of the road surface as well as the present condition of vehicle operation such as shift position, drive wheel speed V mw, slip ratio, etc.

After the execution of this acceleration slip control (step 600), it is determined whether or not the present condition of vehicle operation is a condition of no disturbance such as a brake operation and therefore is a condition permitting learning in which the acceleration slip state is determined depending solely upon the relationship between the road surface and the output of the internal combustion engine (step 610). If it is a condition permitting learning, the above-mentioned respective learned values are learned (step 620). Along with this, if, at this time, the standby and back-up processes are in a state of inhibition, this state of inhibition is released (step 630).

For example, when it has been determined that the present travel road is a low-$\mu$ road as a result of the acceleration slip control, the standby start opening θsb and the standby opening θss are each learned and updated to a smaller value, namely each are learned and updated so as to suppress the output of the internal combustion engine 6 to a smaller value by the standby and back-up processes executed in advance of the performance of the acceleration slip control.

After the execution of the inhibition releasing process in step 630 or when the present condition of vehicle operation is not a condition permitting learning, it is determined whether or not the conditions for terminating the acceleration slip control are established (step 640). If such conditions are established, the opening of the sub-throttle 28 is made to be totally opened (step 650), the operation returning to step 310. If such conditions are not yet established, the operation returns to step 310 with no processes being executed thereafter.

The state of operation during execution of this acceleration slip control is exemplified in a time period from a time t4 in FIG. 7. Namely, in this case, the opening θsn of the sub-throttle 28 is feedback-controlled so that the actual drive wheel speed Vm may coincide with the drive wheel goal speed Vcp.

Further, in a case where a condition permitting learning is established during the execution of this acceleration slip control, learning and updating of the respective learned values are executed according to the then-corresponding condition of vehicle operation such as the opening θsn of the sub-throttle 28.

According to the acceleration slip control system of the preferred embodiment which has the above-mentioned construction and operates as mentioned above, it is apparent that the following advantages can be obtained.

For example, at times of low temperature, since the viscous resistance of the brake fluid increases or the voltage of a battery which is the drive source of the motor causing the operation of the pump 52 decreases, even when the fluid pressure control valves are kept in the pressure increasing mode (a) for the same time period as at a time of normal temperature, the actual amount of increase in the brake fluid remains low, with the result that the desired braking torque is not obtained and therefore the suppression performance of the acceleration slip is decreased relative thereto. As a countermeasure against this, in a case where such decrease in the control performance of the braking torque occurs, the control performed by the driving torque control side is corrected in correspondence with the amount of decrease in the control performance of the braking torque. With such correction, a proper slip control which is the same as that performed when the control performance of the braking torque is not decreased can be performed. Thus, in control such as traction control for improving the kinetic characteristics of a vehicle, it is possible, even at times of low temperature, to obtain the same control performance as at times of normal temperatures.

As a method for control of driving force, this preferred embodiment has shown the respective performances of the modifying process for standby control constant in step 230 of FIG. 5, the modifying process for shift pattern characteristic in step 250 of FIG. 5, the modifying process for EFI control amount in step 270 of FIG. 5, and the modifying process for driving system TRC control amount in step 290 of FIG. 5. Each of these modifying processes is directed to modifying the control constant or control amount so that the driving torque may be reduced, as compared with that which is attainable when the braking system control performance is not reduced and, as a consequence, preventing the occurrence of excessive slip in the drive wheels RL, RR.

Meanwhile, the case where the modifying process for the standby control constant is performed is that where the braking system control decrease amount x is larger than the first decision value x1, the case where the modifying process for shift pattern characteristic is performed is that where the braking system control decrease amount x is larger than the second decision value x2, the case where the modifying process for the EFI control amount is performed is that where the braking system control decrease amount x is larger than the third decision value x3, and the case where the modifying process for the driving system TRC control amount is performed is that where the braking system control decrease amount x is larger than the fourth decision value x4.

A supplementary explanation will now be given as to the relationship of the first to fourth decision values x1 to x4 relative to each other. As already stated, the modifying process for standby control constant is executed only when the driving system or the braking system control is not being executed, the modifying process for EFI control amount and the modifying process for driving system TRC control amount are executed only when the driving system or the braking system control is being executed, and the modifying process for shift pattern characteristic is at all times executed regardless of whether or not the driving system or the braking system control is being executed.

While when the driving system or the braking system control is not being executed the modifying processes for standby control constant and shift pattern characteristic are executed, it is conceivable as an available method to set the second decision value x2 to a value which is larger than the first decision value x1 to thereby bring about execution of the modifying process for shift pattern characteristic in the case of a lower temperature. The reason for this is as follows. In a case where, for example, a second shift position start is caused by executing the modifying process for shift pattern characteristic, the resulting degree of decrease in the driving torque is relatively high. For this reason, preferably, in a case where $x1<x \leq x2$, only the modifying process for standby control constant is executed and, after $x>x2$, the modifying process for shift pattern characteristic is additionally executed for the first time.

Similarly, while when the driving system or the braking system control is executed the modifying processes for EFI control amount and driving system TRC control amount are executed, it can be considered as an available method to set the second decision value x2 to a value which is larger than each of the third and fourth decision values x3 and x4 to thereby bring about execution of the modifying process for shift pattern characteristic in the case of a lower temperature. The reason for this is the same as mentioned above. Note that, regarding the third decision value x3 and the fourth decision value x4, both may be set to the same value or may be distinguished from each other in amount.

The above is the first preferred embodiment which, in a case where a decrease in the braking-torque control performance occurs, is intended to compensate for this by correcting the control performed by the driving-torque control side in correspondence with the condition of decrease in performance thereof. Subsequently, an explanation will be given as to a second preferred embodiment which is intended to compensate for the decrease in the performance thereof by correcting the control contents of the braking-torque control side itself in correspondence with the condition of decrease in performance thereof.

In this second preferred embodiment, explanation will be given on the basis of an example wherein the decrease in the braking-torque control performance is compensated for by means of a so-called "brake TRC control" in which acceleration slip is suppressed by generating the braking torque by imparting brake fluid to the wheel cylinders of the vehicle wheels at a time other than when braking is performed by the driver.

The braking system control compensation process (FIG. 8), for example that which is shown below, is executed based on the braking system control decrease amount x calculated by the process of FIG. 4.

Figure 8:
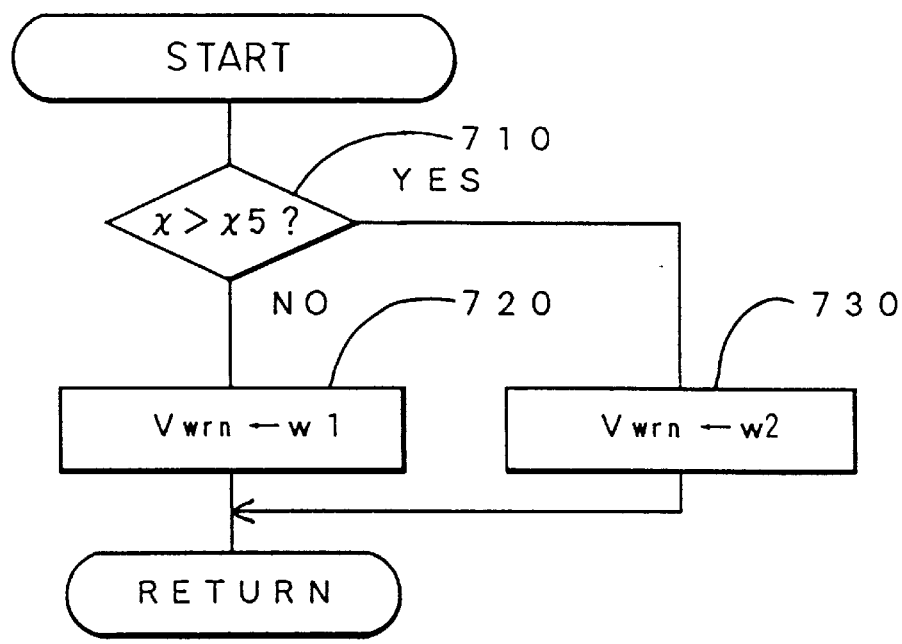
FIG. 8 is a flow chart illustrating a braking system control compensation process according to the preferred embodiment of the present invention.

This process is that which is executed, for example, in 5 ms units. As illustrated in FIG. 8, firstly, in step 710, it is determined whether or not the braking system control decrease amount x calculated by the above-mentioned process of FIG. 4 is larger than a fifth decision value x5. If the result of the determination is "NOT", namely if $x \leq x5$, the operation proceeds to step 720 where a control start speed Vwrn for brake TRC control is set to a first calculated value w1. On the other hand, if the result of the determination is "YES", namely if $x>x5$, the operation proceeds to step 730 where the control start speed Vwrn for brake TRC control is set to a second calculated value w2. Each of these two calculated values w1 and w2 is a value which is obtained, for example, by multiplying the vehicle body speed by a predetermined coefficient. The relationship between the two values is $w1>w2$.

Note that the brake TRC control itself is started when the drive wheel speed has exceeded the above-mentioned control start speed Vwrn. More specifically, in fact the control start speed Vwrn is multiplied by a coefficient k which is determined depending upon other conditions, whereby the thus-obtained value k Vwrn is used as the control start speed.

As mentioned above, in the case of the process shown in FIG. 8, the control start speed Vwrn for brake TRC control is changed over in two stages in correspondence with the decrease in the brake system control performance. As a result, in a case where the decrease in the braking system control performance occurs (step 710: YES), the control start speed Vwrn is set in step 730 to the second calculated value w2 to thereby be able to advance the control start timing for brake TRC control and thus enable procurement of the same control performance as at a normal-temperature time. Note that the control start speed k Vwrn is not only switched stepwise but may be continuously changed according to the braking system control decrease amount x.

While this second preferred embodiment is directed towards enabling the procurement of the same control performance as at times of normal temperatures by correcting the braking-torque control itself in correspondence with the condition of decrease in the braking system control performance, the following measures can also be taken as regards such correction in addition to executing the brake TRC control itself earlier than usual as mentioned above. Namely, particularly at a time of low temperature, since the discharge performance of the pump is decreased, only the pump may be driven beforehand earlier than actually required and actual supply and discharge of the brake fluid to and from the wheel cylinder may be commenced at the same timing as that at which the condition of decrease in the braking system control performance is not detected. Of course, both measures may be used in combined form.

Further, if at the time of detecting the condition of decrease in the braking system control performance, correction is made such that the timing of termination of pump driving is further delayed than at a time of non-detection, it is possible to more reliably ensure a smooth rise in the fluid pressure gradient when re-slip occurs in the termination of the braking system control.

Further, as another example to which the present invention can be applied, there is a method of control which is directed to improving the travel stability of a vehicle by controlling braking torque and engine output torque imparted to drive wheels in addition to the brake TRC control. In each of the above-mentioned preferred embodiments, the control system may be that which is based on the use of the braking system control alone but may of course be that which is based on the concurrent use of both the driving system control and the braking system control.

The present invention is not in any way limited to the above-mentioned preferred embodiments but can be modified in various ways without departing from the scope of the subject matter of the invention. For example, although in the above-mentioned first preferred embodiment a two-valve system is shown in which the sub-throttle 28 is provided with respect to the main throttle 22 and this sub-throttle 28 is opened or closed, if instead a system is used in which only one linkless throttle is provided to the suction system of the engine and this throttle is driven from a totally closed state according to the accelerator operation, it is conceivable, as an available method in the first preferred embodiment, to make the degree of relevant non-linearity high according to, for example, the braking system control decrease amount x. Specifically, the opening of the throttle is modified so that it may be smaller relative to the amount of accelerator operation than at a normal-temperature time. Furthermore, a mapping which shows the relationship between the amount of accelerator operation and the opening of the throttle may be prepared for a low-temperature time as well, and this mapping also may be used.

What is claimed is:

1. A kinetic characteristic control system for a vehicle having a wheel cylinder to impart a braking torque to a wheel and a pump for discharging a brake fluid of a high pressure to said wheel cylinder, comprising:

braking system control means for, by performing changeover control between supply of said brake fluid to said wheel cylinder from said pump and discharge of said brake fluid from said wheel cylinder, controlling said braking torque imparted to said wheel;

driving system control means for controlling a driving torque imparted to said wheel;

braking system control performance decrease state detecting means for detecting a state of decrease in a braking system control performance due to an increase in the viscous resistance of said brake fluid or a decease in the discharge capacity of said pump; and driving system control correcting means for correcting control of the driving torque performed by said driving system control means in correspondence with the state of decrease in said braking system control performance.

2. A kinetic characteristic control system for a vehicle according to claim 1, wherein said braking system control performance decrease state detecting means includes brake fluid temperature detecting means and estimates said state of decrease in said braking system control performance on the basis of a temperature of said brake fluid detected by said brake fluid temperature detecting means.

3. A kinetic characteristic control system for a vehicle according to claim 2, wherein said brake fluid temperature detecting means includes engine cooling water temperature detecting means and estimates said brake fluid temperature on the basis of a engine cooling water temperature detected by said engine cooling water temperature detecting means.

4. A kinetic characteristic control system for a vehicle according to claim 1, further comprising:

acceleration slip detecting means for detecting that an acceleration slip has occurred in said vehicle, whereby when said acceleration slip has been detected by said acceleration slip detecting means, said braking system control means controls said braking torque imparted to said wheel and said driving system control means controls said driving torque imparted to said wheel, thereby suppressing said acceleration slip which has occurred within a desired range.

5. A kinetic characteristic control system for a vehicle according to claim 1, wherein said driving system control means controls said driving torque by adjusting the opening of a throttle for controlling the amount of air intake into an internal combustion engine of said vehicle.

6. A kinetic characteristic control system for a vehicle according to claim 1, wherein said driving system control means includes:

accelerator operation amount detecting means for detecting an amount of operation of an accelerator directing the opening of a throttle for controlling the amount of air intake into an internal combustion engine of said vehicle; and standby control means for, in a case where it has been anticipated that an acceleration slip will occur on the basis of said amount of accelerator operation detected by said accelerator operation amount detecting means, controlling the output torque of the internal combustion engine so as to suppress same, whereby said driving system control correcting means corrects the amount of accelerator operation for initiating the performance of said standby control, in correspondence with said state of decrease in said braking system control performance.

7. A kinetic characteristic control system for a vehicle according to claim 1, wherein said driving system control correcting means includes modifying means for modifying at least one of a fuel injection amount, an air-fuel ratio, and an ignition timing of an internal combustion engine of said vehicle, and modifies at least one of the fuel injection amount, air-fuel ratio, and ignition timing in correspondence with said state of decrease in said braking system control performance.

8. A kinetic characteristic control system for a vehicle according to claim 1, further comprising:

an automatic transmission adapted to automatically change over a shift position according to a preset automatic shift position change line, wherein said driving system control correcting means includes shift position change line modifying means for modifying said automatic shift position change line and modifies said automatic shift position change line so that said shift position change line may be easily shifted up or may be shifted down with difficulty in correspondence with said state of decrease in said braking system control performance.

9. A kinetic characteristic control system for controlling a kinetic characteristic of a vehicle by generating a braking torque by imparting brake fluid to a wheel cylinder of a wheel also at a time other than a time when braking is performed by a vehicle's drive, comprising:

braking-system control means for controlling said braking torque imparted to said wheel by performing changeover control between supply of said brake fluid to said wheel cylinder from a pump discharging the brake fluid at high pressure and discharge of the brake fluid from said wheel cylinder;

braking-system control performance decrease state detecting means for detecting a state of decrease in braking-system control performance due to an increase in the viscous resistance of said brake fluid or a decrease in a discharge capacity of said pump and braking-system control correcting means for correcting braking torque control of said braking-system control means based on said state of decrease in said braking system control performance.

10. A kinetic characteristic control system for controlling a kinetic characteristic of a vehicle by generating a braking torque by imparting brake fluid to a wheel cylinder of a wheel also at a time other than a time when braking is performed by a vehicle's drive, comprising:

braking-system control means for controlling said braking torque imparted to said wheel by performing changeover control between supply of said brake fluid to said wheel cylinder from a pump discharging the brake fluid at high pressure and discharge of the brake fluid from said wheel cylinder;

braking-system control performance decrease state detecting means for detecting a state of decrease in braking-system control performance due to an increase in the viscous resistance of said brake fluid or a decrease in a discharge capacity of said pump; and braking-system control correcting means for correcting braking torque control of said braking-system control means;

wherein said braking system control correcting means corrects said braking torque control to advance a start timing of said braking torque control in correspondence with said state of decrease in said braking system control performance.

11. A kinetic characteristic control system for a vehicle according to claim 10, wherein said braking system control correcting means corrects said start timing of said braking torque control by correcting a drive start timing of said pump in such a manner as to advance said drive start timing thereof when detecting said state of decrease in said braking system control performance, compared to when not detecting same.

12. A kinetic characteristic control system for a vehicle according to claim 10, wherein said braking system control correcting means corrects said start timing of said brake torque control by correcting a brake fluid imparting timing to said wheel cylinder in such a manner as to advance said brake fluid imparting timing when detecting said state of decrease in said braking system control performance, compared to when not detecting same.

13. A kinetic characteristic control system for a vehicle according to claim 10, wherein said braking system control correcting means corrects a termination timing of a driving of said pump in such a manner as to delay said termination timing further when detecting said state of decrease in said braking system control performance than when not detecting same.

* * * * *